US005994653A

United States Patent [19]

Poleshuk et al.

[11] Patent Number: 5,994,653

[45] Date of Patent: Nov. 30, 1999

[54] MULTIFUNCTION SWITCH ASSEMBLY WITH IMPROVED TURN SIGNAL CANCEL SYSTEM

[75] Inventors: LeRoy A. Poleshuk, White Lake; Jeffrey K. Wiersing, Walled Lake; Owen D. Winkler, Westland; James B. Wright, Sterling Heights, all of Mich.

[73] Assignee: Lear Automotive Dearborn, Inc., Southfield, Mich.

[21] Appl. No.: 08/992,970

[22] Filed: Dec. 18, 1997

[51] Int. Cl.[6] .......... H01H 3/16

[52] U.S. Cl. .......... 200/61.3; 200/61.27

[58] Field of Search .......... 200/61.27, 61.54, 200/61.3–61.37

[56] References Cited

U.S. PATENT DOCUMENTS

| | | | |
|---|---|---|---|
| 3,286,054 | 11/1966 | Jordan et al. | 200/61.34 |
| 3,794,785 | 2/1974 | Tomlinson | 200/61.27 |
| 3,916,126 | 10/1975 | Wilkinson | 200/61.27 |
| 4,351,991 | 9/1982 | Morita et al. | 200/61.27 |
| 5,021,617 | 6/1991 | DeShong | 200/61.27 |

*Primary Examiner*—Michael Friedhofer
*Attorney, Agent, or Firm*—MacMillan, Sobanski and Todd, LLC

[57] ABSTRACT

A multifunction switch assembly includes a handle having an actuator mounted at an inner end. The actuator and handle are pivotally mounted in a housing. First and second return springs mounted in the housing bias the actuator towards the neutral position from the left and right turn positions, respectively. The first return spring preferably imparts a higher force against the actuator than the second return spring, in order to counter the effects of gravity acting upon the handle. The first and second return spring preferably both impart opposite forces on the actuator when in the neutral position in order to eliminate play.

19 Claims, 4 Drawing Sheets

20 26 46 48 50 42 40 42 48 50 22 24 44 46 32 30 34

30
54
55
55
52
52
32

40
64
30
56
78
52
70
50
72
52
54
76
74
66

32
30
52
54
58
66
58
64
56
62
60

MULTIFUNCTION SWITCH ASSEMBLY WITH IMPROVED TURN SIGNAL CANCEL SYSTEM

BACKGROUND OF THE INVENTION

The present invention relates generally to a multifunction switch assembly and more particularly to a multifunction switch assembly with an improved turn signal cancel system having two return springs returning an actuator and to handle a neutral position.

Known multifunction switch assemblies generally comprise a handle having an actuator mounted at an inner end. The actuator includes two detent fingers spring biased outwardly from the actuator into detents formed in a housing. The handle and actuator are pivotally mounted in the housing among a left turn position, a neutral position and a right turn position. A spring mounted in the actuator near the pivot point engages surfaces in the housing to bias the actuator and handle toward the neutral position from either the left turn or right turn position.

There are several drawbacks to the current return spring design. First, the size of the actuator must be large to accommodate the return spring. Second, since the spring is mounted close to the pivot point, a very strong spring must utilized in order to compensate for the lack of leverage. Third, since the same spring is utilized to the return the handle and actuator from both the left and right turn positions to the neutral position, the spring must have a higher force in order to push the handle up against gravity from the left turn position to the neutral position. However, the spring is then of a higher force than necessary for returning the handle from the right turn position to the neutral position, since the force is acting in the same direction as gravity acting upon the handle. Further, in the neutral position, the spring does not impart forces upon the handle and actuator in opposite directions. As a result, a user may perceive "play" in the handle in the neutral position.

SUMMARY OF THE INVENTION

The present invention provides a multifunction switch assembly having an improved turn signal cancel system. Generally, a first return spring is provided for biasing the actuator and handle toward the neutral position from the left turn position. A second return spring is provided for biasing the actuator and handle towards the neutral position from the right turn position. Preferably, the return springs are mounted in the housing and impart opposite forces on outer ends of arms of the actuator. This has several advantages. First, the first and second return springs preferably having different spring force constants, or otherwise impart different forces upon the actuator. Preferably, the first return spring imparts a higher force against the actuator than the second return spring, since the force of gravity acting upon the handle must be counteracted in returning the actuator and handle from the left turn position to the neutral position. Second, by moving the return springs to the housing, the actuator and entire switch assembly can be reduced in size. Third, the first and second return springs preferably both impart opposite forces upon the actuator when the actuator and handle are in the neutral position. This eliminates any perceived "play" and improves the perceived quality of the switch assembly.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
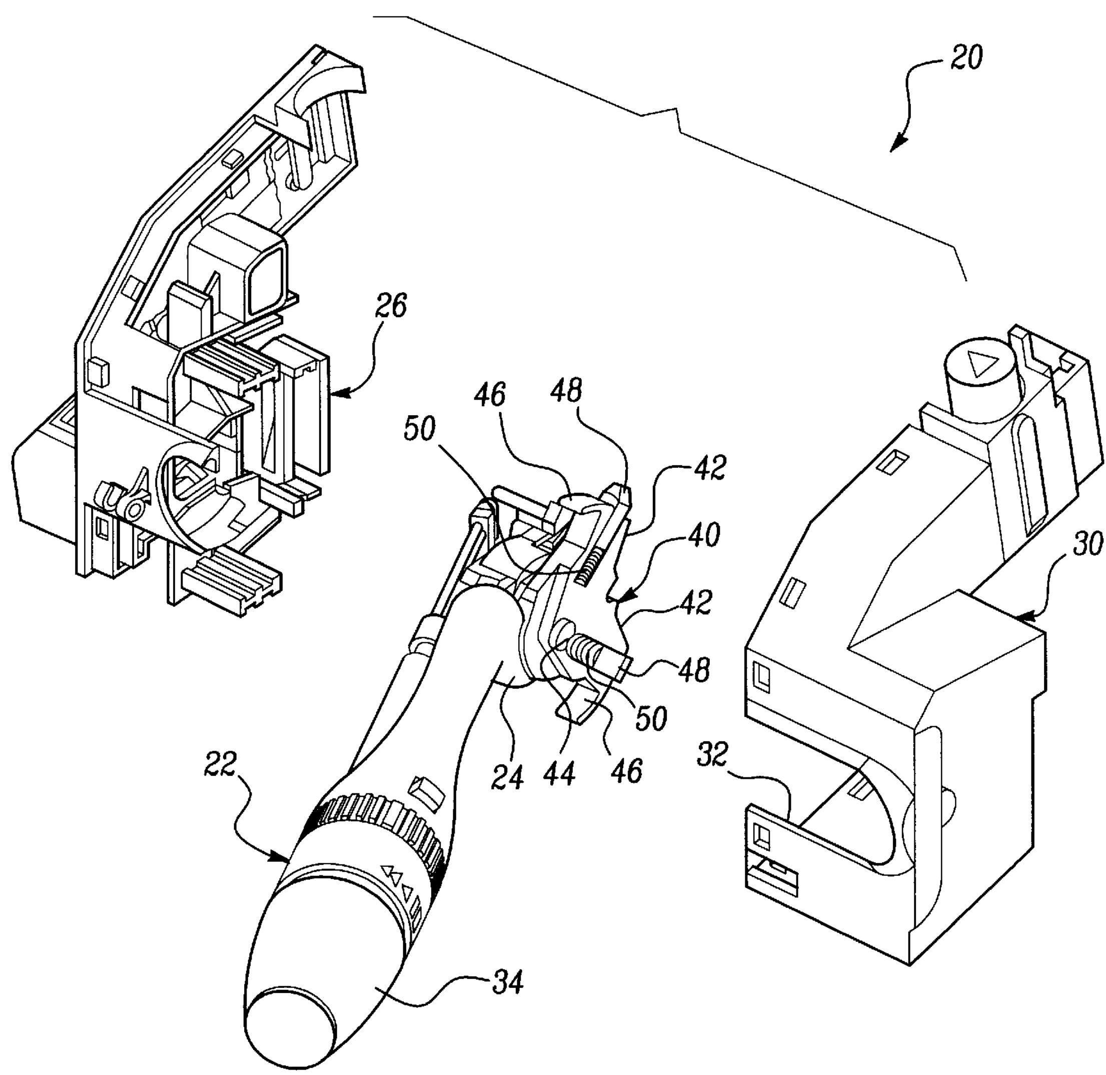
FIG. 1 is a partially exploded perspective view of the multifunction switch assembly of the present invention.

A multifunction switch assembly 20 according to the present invention is shown partially exploded in FIG. 1. The multifunction switch assembly 20 generally comprises a handle 22 having an inner end 24 for pivotally mounting in a base 26 and housing 30. The housing 30 includes an opening 32 through which the handle 22 passes. As can been seen in FIG. 1, the multifunction switch assembly 20 may include a rotatable knob 34 mounted on an outer end of the handle 22 for activating vehicle functions, such as windshield wipers. An actuator 40 is mounted to the inner end 24 of the handle 22. The actuator 40 includes a pair of arms 42 extending generally radially from the pivot point 44. At the outer end of each of the arms 42 is a generally circumferential projection 46. Detent fingers 48 are biased radially outwardly by springs 50 from each of the arms 42.

Figure 2:
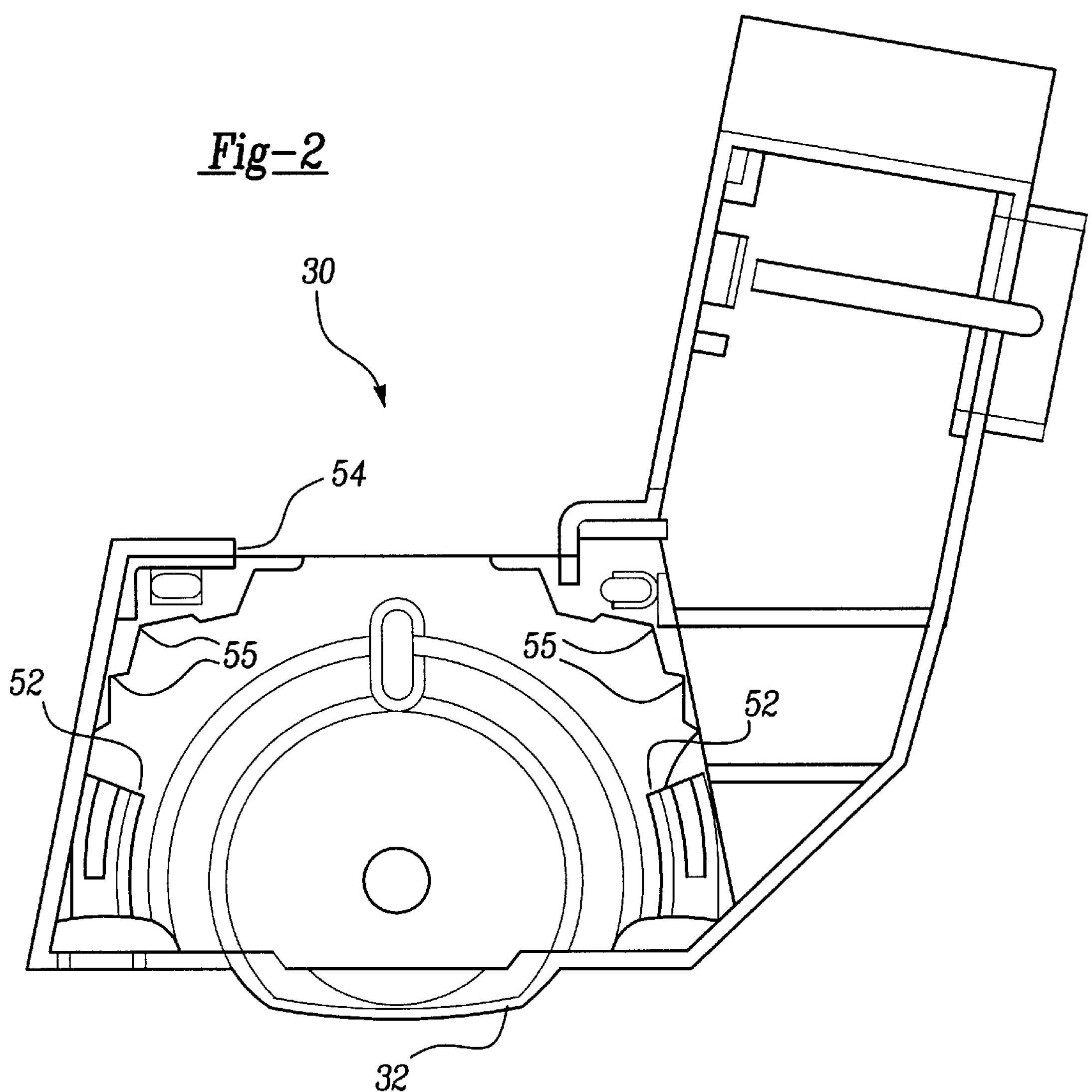
FIG. 2 illustrates the interior of the housing of FIG. 1.

As to can be seen in FIG. 2, the housing 30 includes a pair of spring chambers adjacent an opening 54 opposite the opening 32 for receiving the handle 22. The housing 30 further includes a pair of detents 55 adjacent each spring chamber 52.

Figure 3:
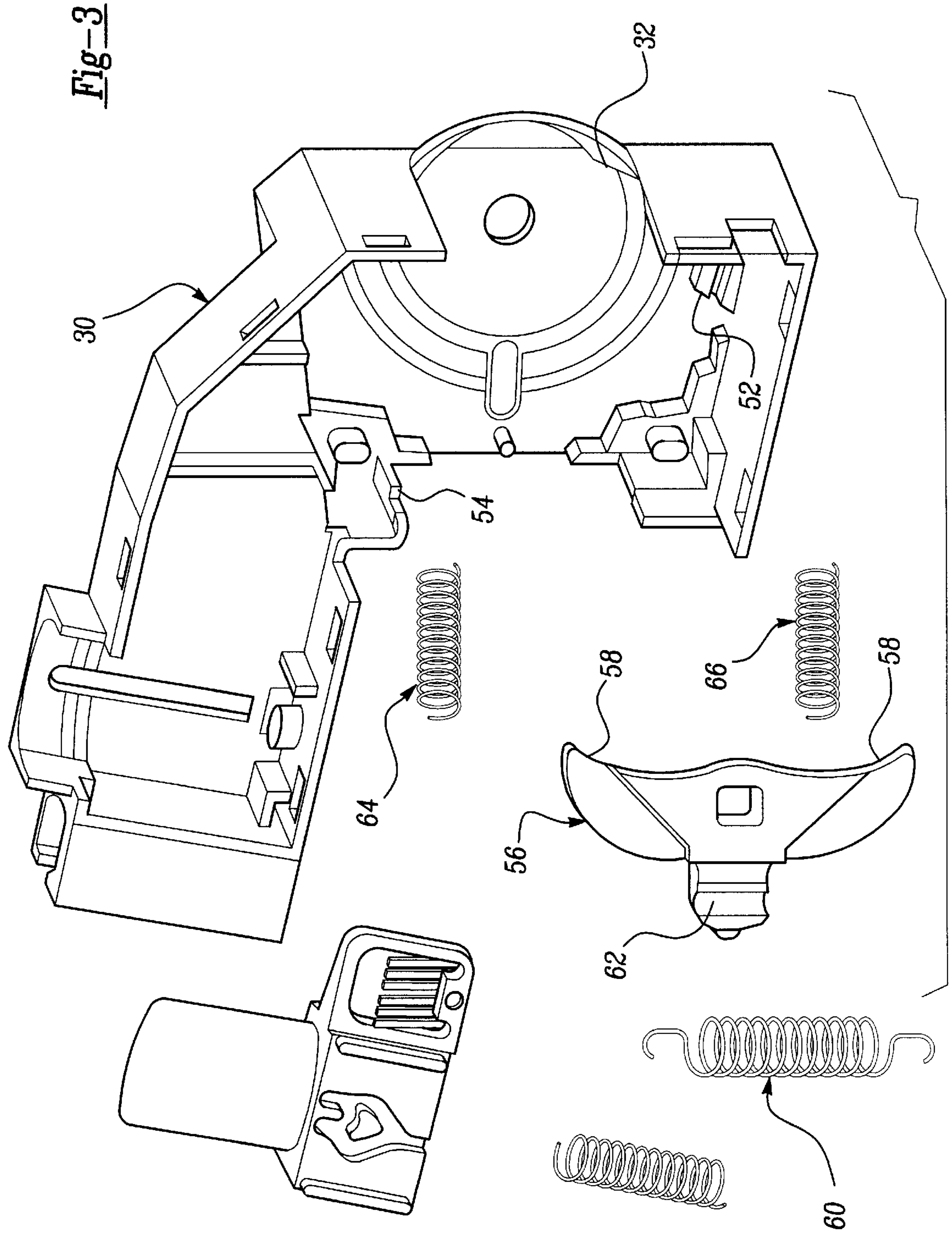
FIG. 3 is a partially exploded perspective of the housing of FIG. 1.

FIG. 3 illustrates an exploded perspective view of the housing 30 and a cancel cam assembly 56 having a pair of cancel cams 58, generally as is known in the art. A spring 60 is secured to the housing 30 and received within a recess 62 in the cam assembly 56. A first return spring 64 and a second return spring 66 are disposed within the spring chambers 52 in the housing 30.

Figure 4:
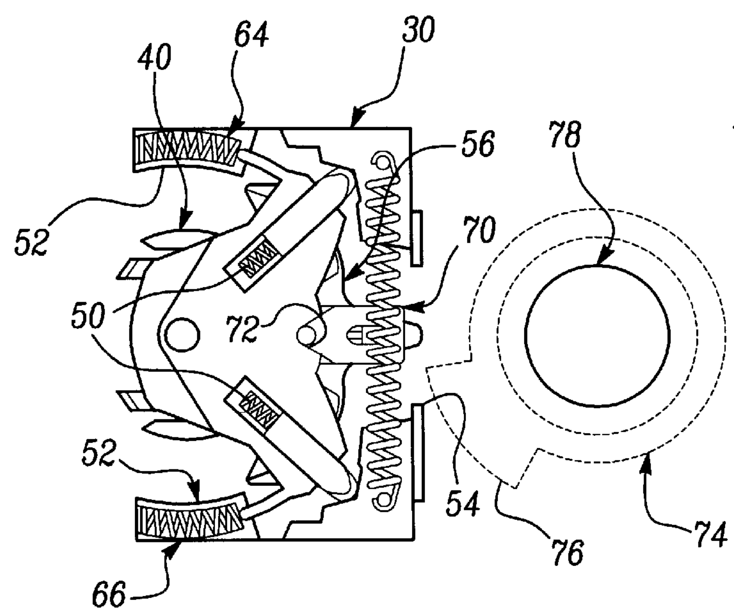
FIG. 4 is an assembled sectional view showing the actuator and housing of FIG. 1 in a neutral position.

FIG. 4 illustrates the actuator 40 in a neutral position in the housing 30. The circumferential projections 46 are partially disposed in the spring chambers 52 and the actuator 40 is a biased toward the neutral position by both the first return spring 64 and second return spring 66, which are each imparting forces against the actuator 40 in opposite directions to eliminate play in the neutral position. A cancel pawl 70 is spring loaded into the cancel cam assembly 56, and is disposed in a detent 72 in the actuator 40. The cancel pawl 70 is positioned adjacent the opening 54 in the housing 30 adjacent a rotor 74 having a cancel lobe 76. As is well known, the rotor 74 is mounted to the steering column 78 or steering wheel and rotates with the steering column 78.

Figure 5:
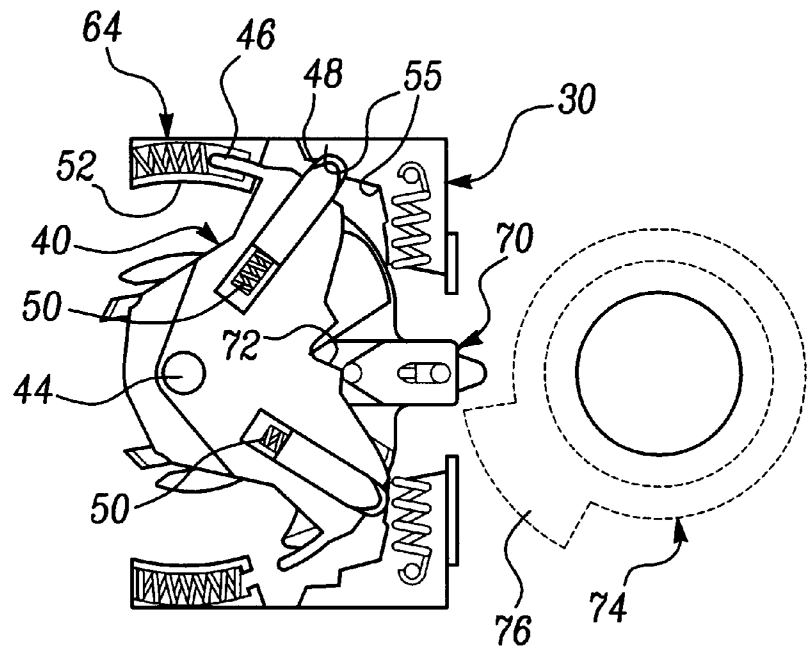
FIG. 5 shows the actuator of FIG. 4 in a left turn position.
Figure 6:
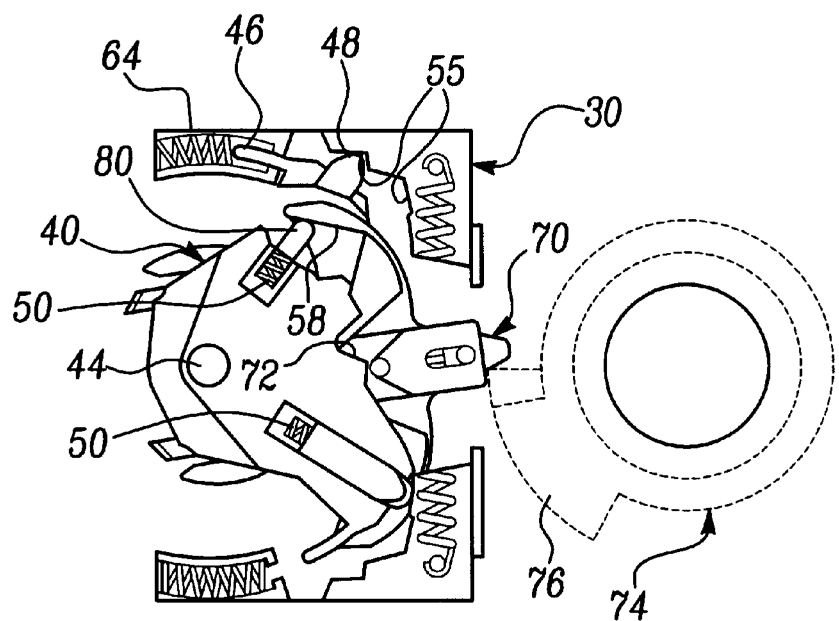
FIG. 6 shows the actuator of FIG. 5, partially broken away, during a left turn cancel.

When the handle 22 and actuator 40 are moved to the left turn position as shown in FIG. 5 to activate the left turn signal, the detent finger 48 in the actuator 40 moves among the detents 55 in the housing 30, and is retained in the left turn position by the detent finger 48 and detent 55. The actuator 40 is pivoted about the pivot point 44 and the circumferential projection 46 penetrates the spring chamber 52, thereby compressing the first return spring 64. Preferably the first return spring 64 has a higher spring constant than the second return spring 66, or is otherwise configured to impart a higher force on the actuator 40 than the second return spring 66. At the same time, the cancel pawl 70 is moved out of detent 72 in the actuator 40 and extends through the opening 54 in the housing 30 toward the rotor 74.

The handle 22 and actuator 40 are maintained in the left turn position as shown in FIG. 5 and the left turn signal is activated until the rotor 74 is rotated clockwise, such that the cancel lobe 76 on the rotor 74 pushes the cancel pawl 70 counterclockwise. The cancel pawl 70 drives the cancel cam assembly 56 counterclockwise, thereby causing the cancel cam 58 to engage a shoulder 80 on the rear side of the detent finger 48, thereby removing detent finger 48 from the detent 55 in the housing 30, in turn permitting first return spring 64 to rotate the actuator 40 and handle 22 clockwise, returning the actuator 40 and handle 22 to the neutral position. The right turn position, right turn signal and right turn cancel would operate in a similar manner with the second return spring 66. The multifunction switch assembly 20 can be reduced in size due to the use of the two return springs 64, 66 mounted in the housing 30. The perceived quality of the switch assembly 20 is improved by eliminating any play in the handle 22 and actuator 40, because the first and second return springs 64, 66 impart opposite forces on the actuator 40 when the actuator is in the neutral position. Further, the first return spring can be provided with a higher spring constant, or otherwise configured to have greater force on the actuator in order to compensate for the force of gravity acting upon the handle 22.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A multifunction switch assembly comprising:

a handle having an inner end mounted in a housing;

an actuator pivotally mounted in said housing at said inner end of said handle, said actuator pivotally moveable about a pivot point among a left turn position, a neutral position, and a right turn position, said actuator including a pair of arms extending generally radially from said pivot point;

a first return spring biasing said actuator about said pivot point toward said neutral position when said actuator is in said left turn position; and a second return spring biasing said actuator about said pivot point toward said neutral position when said actuator is in said right turn position, said first and second returns springs each biasing a radially outer end of one of said arms.

2. The multifunction switch assembly of claim 1 wherein said first return spring and said second return spring exert opposing forces upon said actuator when said actuator is in said neutral position.

3. The multifunction switch assembly of claim 1 wherein said first return spring and said second return spring are mounted in said housing.

4. The multifunction switch assembly of claim 1 wherein said first return spring does not bias said actuator when said actuator is in said right turn position and said second return spring does not bias said actuator when said actuator is in said left turn position.

5. The multifunction switch assembly of claim 1 wherein detent fingers are biased radially outwardly from said outer ends of each of said arms.

6. The multifunction switch assembly of claim 1 wherein each of the arms includes a generally circumferential projection from the outer end.

7. The multifunction switch assembly of claim 6 wherein said housing includes a pair of spring chambers at least partially enclosing each of said first and second return springs, said circumferential projections extending into said spring chambers to engage said first and second return springs.

8. A multifunction switch assembly comprising:

a handle having an inner end mounted in a housing;

an actuator pivotally mounted in said housing at said inner end of said handle, said actuator pivotally moveable about a pivot point among a left turn position, a neutral position, and a right turn position;

a first return spring biasing said actuator about said pivot point toward said neutral position when said actuator is in said left turn position; and a second return spring biasing said actuator about said pivot point toward said neutral position when said actuator is in said right turn position, wherein said first return spring exerts a higher force upon said actuator when said actuator is in said left turn position than said second return spring exerts when said actuator is in said right turn position.

9. A multifunction switch assembly comprising:

a handle having an inner end mounted in a housing;

an actuator pivotally mounted in said housing at said inner end of said handle, said actuator pivotally moveable about a pivot point among a left turn position, a neutral position, and a right turn position;

a first return spring biasing said actuator about said pivot point toward said neutral position when said actuator is in said left turn position;

a second return spring biasing said actuator about said pivot point toward said neutral position when said actuator is in said right turn position; and at least one spring-biased detent finger and at least one detent between said actuator and said housing, said detent finger engaging said at least one detent when said actuator is in said left turn position.

10. The multifunction switch assembly of claim 9 further including a cancel cam assembly pivotally mounted adjacent said actuator, said detent finger and detent retaining said actuator in said left turn position while said first return spring is biasing said actuator toward said neutral position, said cancel cam assembly selectively removing said detent finger from said detent, thereby permitting said first return spring to return said actuator to said neutral position.

11. The multifunction switch assembly of claim 10 further including a rotor rotatable with a steering column, said rotor including a cancel lobe actuating said cancel cam assembly upon rotation of said rotor when said actuator is in said left turn position.

12. An actuator and housing assembly for a turn signal switch comprising:

an actuator pivotally mounted in said housing, said actuator pivotally moveable about a pivot point among a left turn position, a neutral position, and a right turn position;

a first return spring biasing said actuator about said pivot point toward said neutral position when said actuator is in said left turn position; and a second return spring biasing said actuator about said pivot point toward said neutral position when said actuator is in said right turn position, wherein said first return spring exerts a higher force upon said actuator when said actuator is in said left turn position than said second return spring exerts when said actuator is in said right turn position.

13. The actuator and housing assembly of claim 12 wherein said first return spring and said second return spring exert opposing forces upon said actuator when said actuator is in said neutral position.

14. The actuator and housing assembly of claim 12 wherein said first return spring and said second return spring are mounted in said housing.

15. The actuator and housing assembly of claim 14 further including at least one spring-biased detent finger and at least one detent between said actuator and said housing, said detent finger engaging said at least one detent when said actuator is in said left turn position.

16. The actuator and housing assembly of claim 15 further including a cancel cam assembly pivotally mounted adjacent said actuator, said detent finger and detent retaining said actuator in said left turn position while said first return spring is biasing said actuator toward said neutral position, said cancel cam assembly selectively removing said detent finger from said detent, thereby permitting said first return spring to return said actuator to said neutral position.

17. A multifunction switch assembly comprising:

a handle having an inner end mounted in a housing;

an actuator pivotally mounted in said housing at said inner end of said handle, said actuator pivotally moveable among a left turn position, a neutral position, and a right turn position;

a first return spring mounted in said housing and biasing said actuator toward said neutral position when said actuator is in said left turn position;

a second return spring mounted in said housing and biasing said actuator toward said neutral position when said actuator is in said right turn position;

said first return spring and said second return spring simultaneously exerting opposite forces upon said actuator when said actuator is in said neutral position;

wherein said first return spring exerts a higher force upon said actuator when said actuator is in said left turn position than said second return spring exerts when said actuator is in said right turn position.

18. The multifunction switch assembly of claim 17 wherein said actuator is pivotally moveable about a pivot point among said left turn position, said neutral position, and said right turn position, said first and second return springs biasing said actuator in opposite rotational directions about said pivot point to said neutral position from said left and right turn positions, respectively.

19. A multifunction switch assembly comprising:

a handle having an inner end mounted in a housing:

an actuator pivotally mounted in said housing at said inner end of said handle, said actuator pivotally moveable among a left turn position, a neutral position, and a right turn position;

a first return spring biasing said actuator toward said neutral position when said actuator is in said left turn position; and a second return spring biasing said actuator toward said neutral position when said actuator is in said right turn position, wherein said first return spring has a higher spring constant than said second return spring.

* * * * *